United States Patent
Gay et al.

(10) Patent No.: US 10,218,729 B2
(45) Date of Patent: Feb. 26, 2019

(54) SPECIALIZING UNSUPERVISED ANOMALY DETECTION SYSTEMS USING GENETIC PROGRAMMING

(71) Applicant: Cisco Technology, Inc., San Jose, CA (US)

(72) Inventors: Sébastien Gay, Les Rousses (FR); Laurent Sartran, Palaiseau (FR); Jean-Philippe Vasseur, Anchorage, AK (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 15/205,122

(22) Filed: Jul. 8, 2016

(65) Prior Publication Data
US 2018/0013776 A1    Jan. 11, 2018

(51) Int. Cl.
*H04L 29/06* (2006.01)
*G06N 99/00* (2010.01)

(52) U.S. Cl.
CPC ....... *H04L 63/1425* (2013.01); *G06N 99/005* (2013.01); *H04L 63/20* (2013.01)

(58) Field of Classification Search
CPC .................. H04L 63/1416; H04L 63/1425
See application file for complete search history.

(56) References Cited

U.S. PATENT DOCUMENTS

| 7,689,455 | B2 | 3/2010 | Fligler et al. |
| 8,654,655 | B2* | 2/2014 | Silveira Filho ..... H04L 63/1416 370/242 |
| 8,838,510 | B2 | 9/2014 | Baughman et al. |
| 9,349,103 | B2 | 5/2016 | Eberhardt, III et al. |
| 2015/0150131 | A1 | 5/2015 | Boutnaru et al. |
| 2017/0339187 | A1* | 11/2017 | Papamartzivanos .... H04L 63/20 |

OTHER PUBLICATIONS

K-Means—Stanford NPL 2008; obtained from https://nlp.stanford.edu/IR-book/html/htmledition/k-means-1.html.*
Lu et al. "Unsupervised Anolmaly Detection Using an Evolutionary Extension of K-Means Algorithm", International Journal of Information and Computer Security, vol. 2, No. 2, pp. 1-37, Jul. 2001, Inderscience Enterprises Ltd.

* cited by examiner

*Primary Examiner* — Tri M Tran
(74) *Attorney, Agent, or Firm* — Parker Ibrahim & Berg LLP; James M. Behmke; Stephen D. LeBarron

(57) ABSTRACT

In one embodiment, a device in a network receives sets of traffic flow features from an unsupervised machine learning-based anomaly detector. The sets of traffic flow features are associated with anomaly scores determined by the anomaly detector. The device ranks the sets of traffic flow features based in part on their anomaly scores. The device applies a genetic programming approach to the ranked sets of traffic flow features to generate new sets of traffic flow features. The genetic programming approach uses a fitness function that is based in part on the rankings of the sets of traffic flow features. The device specializes the anomaly detector to emphasize a particular type of anomaly using the new sets of traffic flow features.

14 Claims, 10 Drawing Sheets

SPECIALIZING UNSUPERVISED ANOMALY DETECTION SYSTEMS USING GENETIC PROGRAMMING

TECHNICAL FIELD

The present disclosure relates generally to computer networks, and, more particularly, to specializing unsupervised anomaly detection systems using genetic programming.

BACKGROUND

Anomaly detection is an important tool to assess the behavior of a communication network. In general, anomaly detection techniques seek to identify network behaviors that deviate from the pattern of normal network behavior. For example, if a given host in the network that does not normally receive a high volume of traffic suddenly begins to experience a high volume of traffic, an anomaly detection mechanism in the network may flag this condition as anomalous.

One prominent application of anomaly detection is the detection of network attacks. For example, anomaly detectors are potentially able to detect zero-day attacks. These types of attacks are so-named because of their root cause: the exploitation of a previously unknown vulnerability in the network. Notably, once the vulnerability is detected, the responsible entity has zero days to correct or mitigate the vulnerability in the network. Since zero-day attacks are, by their very nature, of an unknown type until they occur, anomaly detectors are well suited to detect their presence by identifying behavioral changes in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
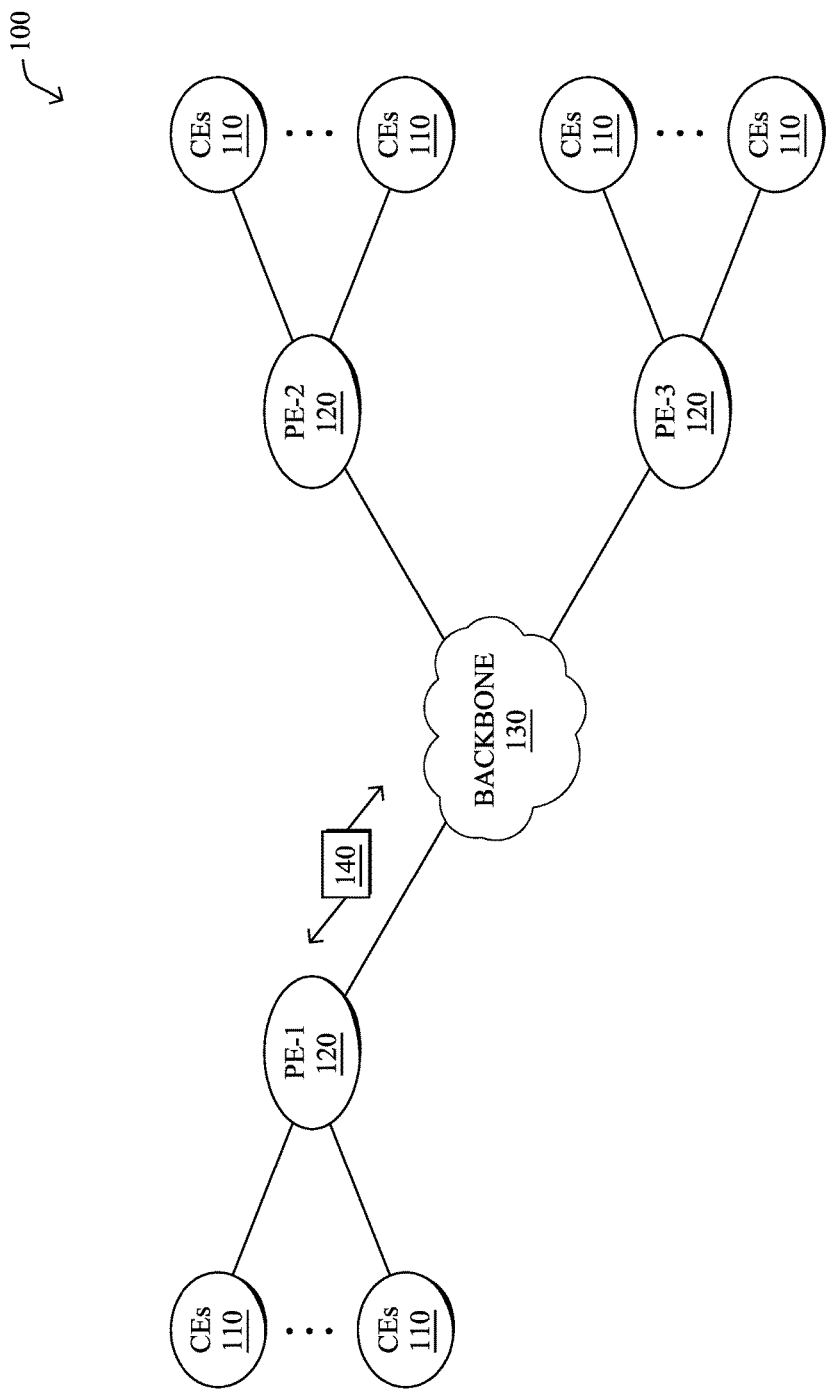
FIGS. 1A-1B illustrate an example communication network.

According to one or more embodiments of the disclosure, a device in a network receives sets of traffic flow features from an unsupervised machine learning-based anomaly detector. The sets of traffic flow features are associated with anomaly scores determined by the anomaly detector. The device ranks the sets of traffic flow features based in part on their anomaly scores. The device applies a genetic programming approach to the ranked sets of traffic flow features to generate new sets of traffic flow features. The genetic programming approach uses a fitness function that is based in part on the rankings of the sets of traffic flow features. The device specializes the anomaly detector to emphasize a particular type of anomaly using the new sets of traffic flow features.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
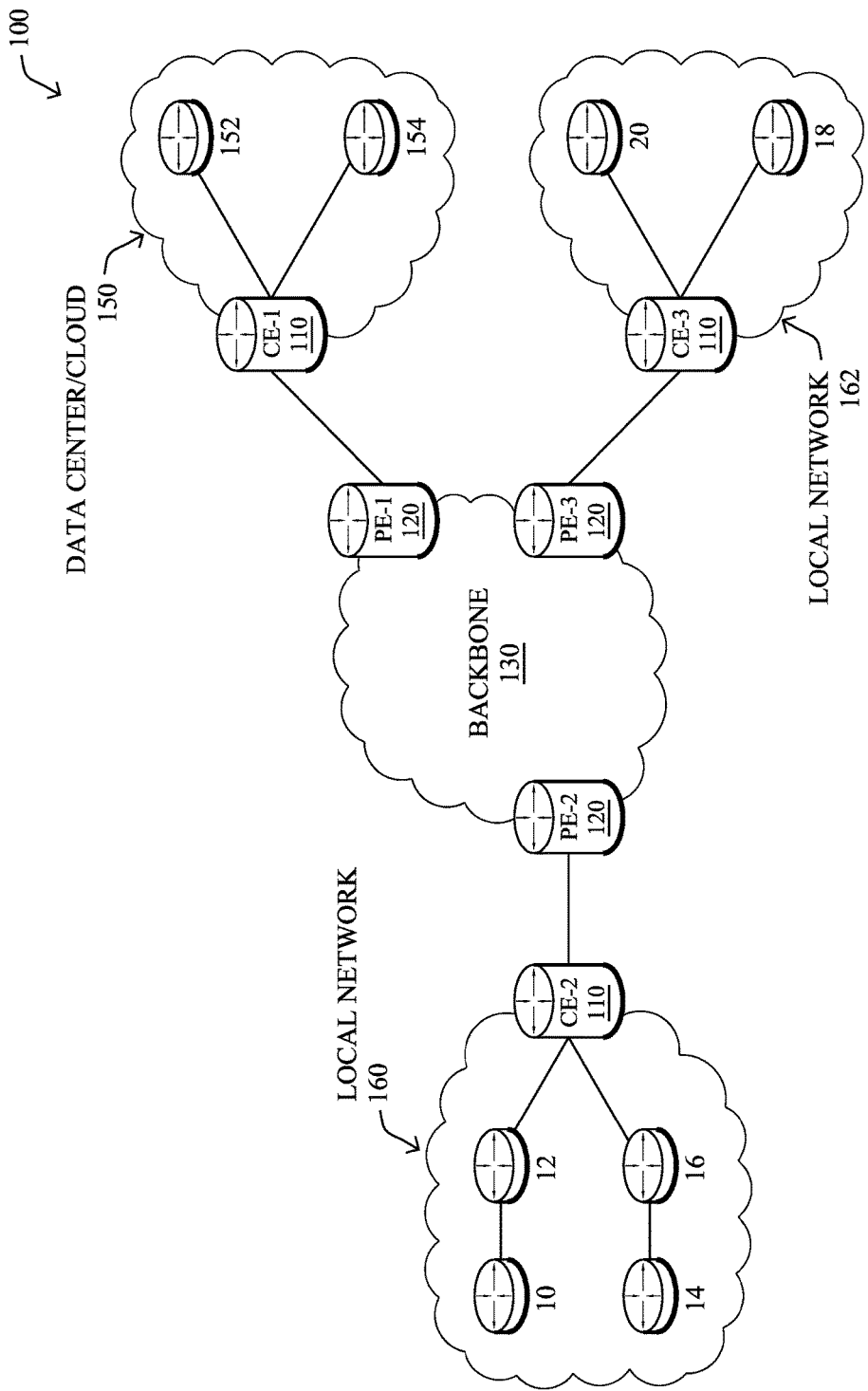

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
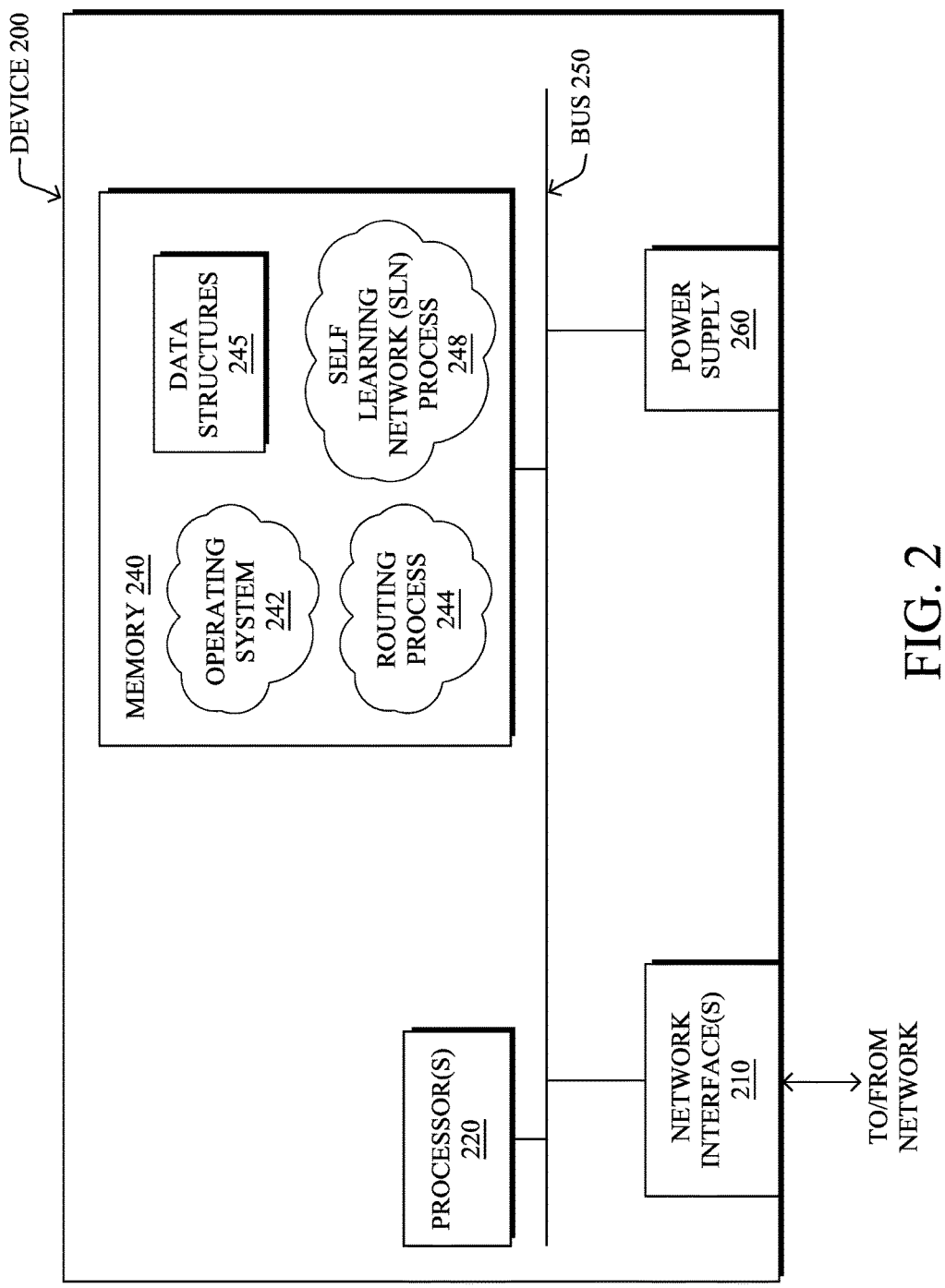
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
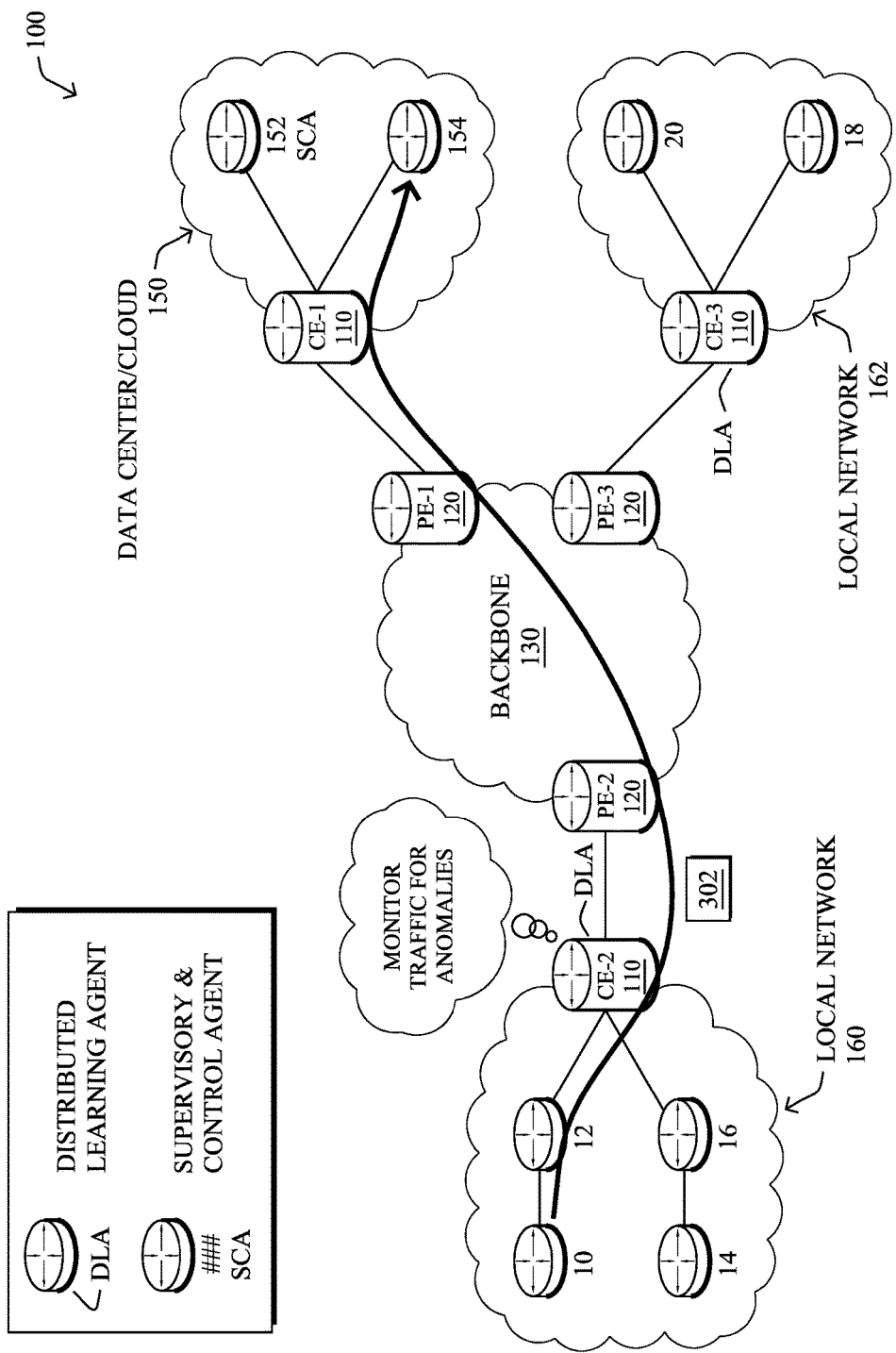
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
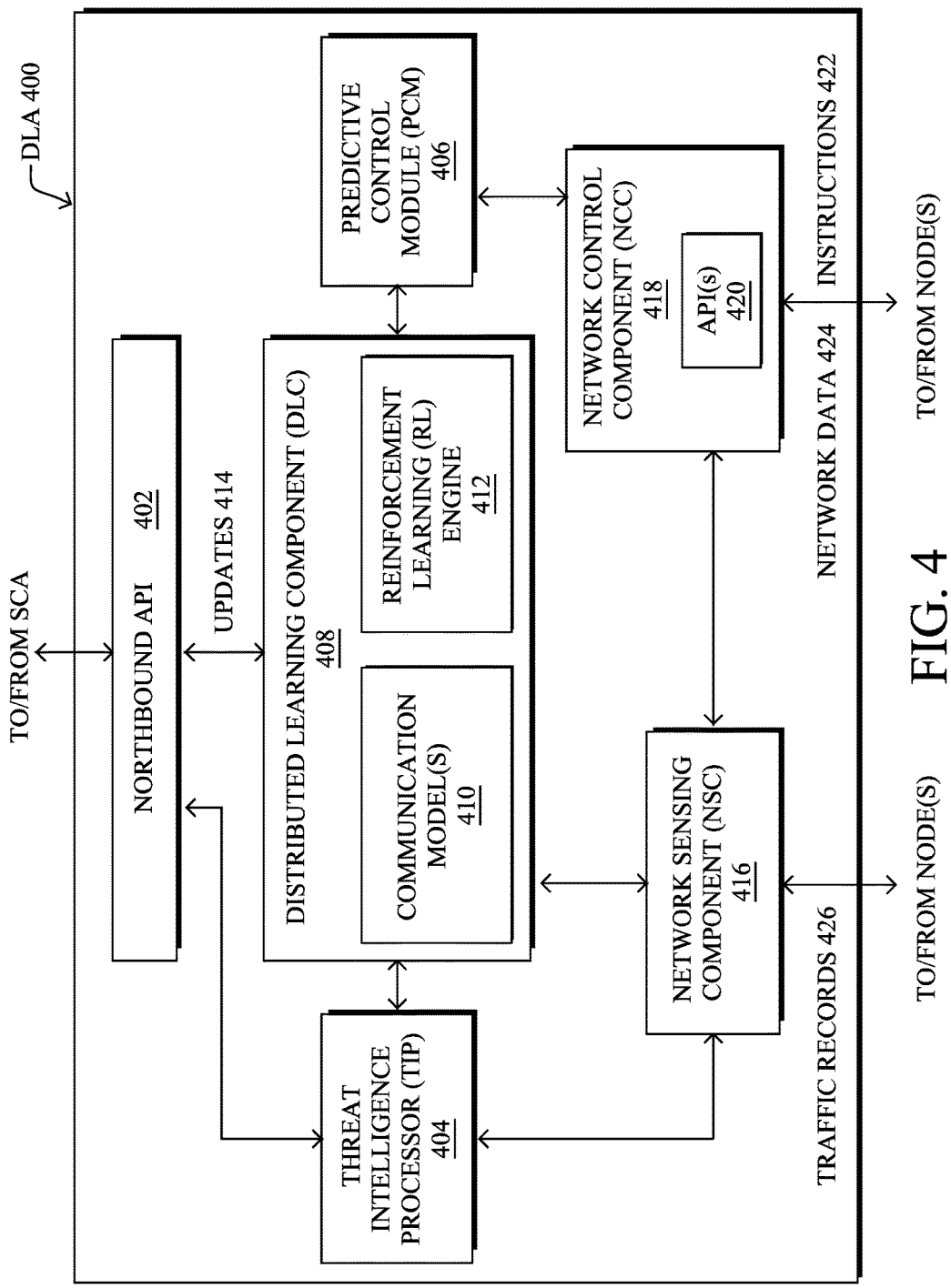
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, machine-learning based anomaly detectors may use supervised learning techniques, unsupervised learning techniques, or semi-supervised learning techniques. Generally, supervised learning entails the use of a training set of data that is used to train the model to apply labels to the input data. For example, the training data may include sample traffic data that is pre-labeled "normal," or "malware-generated," to train the model regarding what is considered normal and what is not. On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

In the specific context of unsupervised learning, an unsupervised anomaly detector may identify statistical deviation from the normal activity patterns (e.g., traffic patterns in a computer network). These types of anomaly detectors are quite powerful as they are able to adapt to changing patterns of normal behavior over time. Such a detector may leverage, for example, auto-encoders, dictionary learning, or sparse coding to compress the traffic patterns to a latent low-dimensional representation of the norm. Because an unsupervised anomaly detector.

One challenge when deploying an unsupervised anomaly detector concerns the ranking of anomalous conditions. Notably, generic anomaly detectors typically assess a large number of input features, which can impede the ability of the detector to discern anomalies that exhibit statistical deviations on only a few of the input features. This can lead to the situation in which certain types of anomalies are ranked lower than expected for the sole reason that they are visible on fewer of the input features. For example, consider the case of DNS-related attacks such as fast-flux service network (FFSN) attacks, domain generation algorithm (DGA)

attacks, etc. In such a case, if the anomaly detector is designed to evaluate less DNS-related features than others, any DNS-related attacks may rank lower, despite there being a clear and observable deviation on these features.

Thus, a tradeoff may be made between employing a generic anomaly detector or a very specific anomaly detector, with respect to the treatment of different anomalous conditions. For instance, even if the anomaly detector is designed to monitor all traffic patterns (e.g., to detect zero-day attacks, etc.), it may still be advantageous to instantiate, at some particular locations in the network, or at a particular time, a specialized version of this unsupervised process that is specialized for a particular class of anomalies (e.g., focusing on DNS-related anomalies, etc.).

Specializing Unsupervised Anomaly Detection Systems Using Genetic Programming

The techniques herein allow for the instantiation of specialized versions of unsupervised anomaly detectors, to promote specific subsets of anomalies, while keeping the advantages of unsupervised methods. In some aspects, the techniques may leverage genetic programming to select the right features for a particular situation/class of anomalies. The "genome" of each individual may describe the enabled features, evaluation can be performed by running the anomaly detection process on a set of traffic traces. Then, the different individuals are evaluated against a fitness function that depends on the rank of the anomalies that are to be promoted. In various cases, the techniques herein can be implemented prior to network deployment or online after an observation phase.

Specifically, according to one or more embodiments of the disclosure as described in detail below, a device in a network receives sets of traffic flow features from an unsupervised machine learning-based anomaly detector. The sets of traffic flow features are associated with anomaly scores determined by the anomaly detector. The device ranks the sets of traffic flow features based in part on their anomaly scores. The device applies a genetic programming approach to the ranked sets of traffic flow features to generate new sets of traffic flow features. The genetic programming approach uses a fitness function that is based in part on the rankings of the sets of traffic flow features. The device specializes the anomaly detector to emphasize a particular type of anomaly using the new sets of traffic flow features.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 5A:
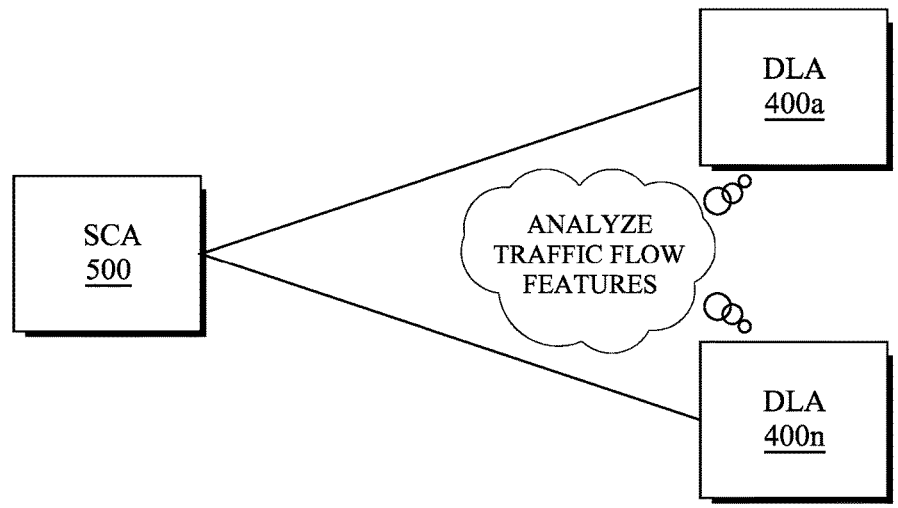
FIGS. 5A-5E illustrate an example of the specialization of an anomaly detector.
Figure 5B:
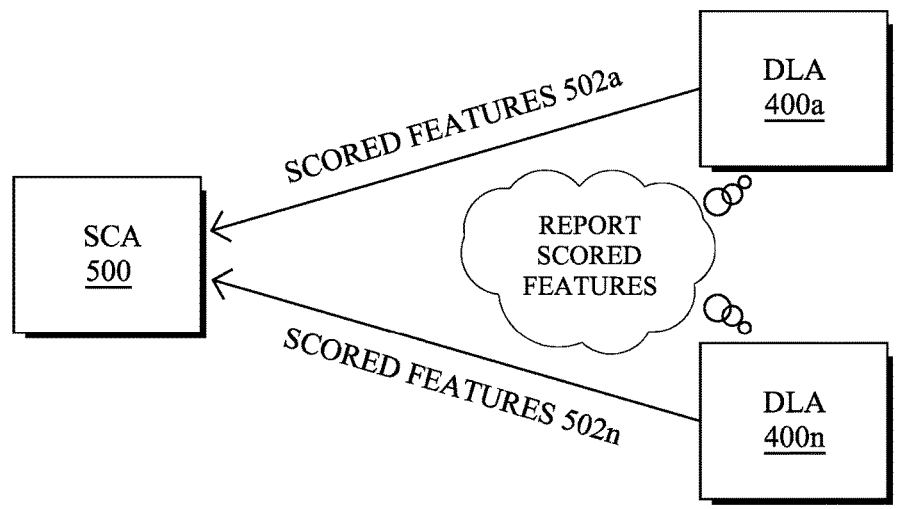

Operationally, FIGS. 5A-5E illustrate an example of the specialization of an anomaly detector, according to various embodiments. As shown in FIG. 5A, one potential implementation may include an SCA 500 in communication with any number of DLAs 400a-400n (e.g., a first through $n^{th}$ DLA). During operation, DLAs 400a-400n may analyze captured traffic flow features using an unsupervised, machine learning-based anomaly detector. These anomaly detectors are described in the following sections for purposes of illustration only, and are not limited as such. As would be appreciated, the techniques described herein can be applied to any number of different types of unsupervised anomaly detectors.

The anomaly detectors of DLAs 400a-400n may use as input, for each successive time step, feature vectors for each object of interest (e.g., device, traffic flow, etc.). Generally, these feature vectors are a numerical representation of the behavior of the object. For instance, the total traffic and the total number of packets exchanged by hosts may be of interest. In that case, the objects of interests are the hosts on the network, and the features are the total traffic and the total number of packets. Using this input, and a set of fixed parameters, the DLA may learn a model, so that most samples fit the model well. For example, the model may be a function f(x) such that x belongs to the space of feature vectors, and so that f is small on most input samples, and takes higher values on anomalous or rarely seen input samples.

Figure 5C:
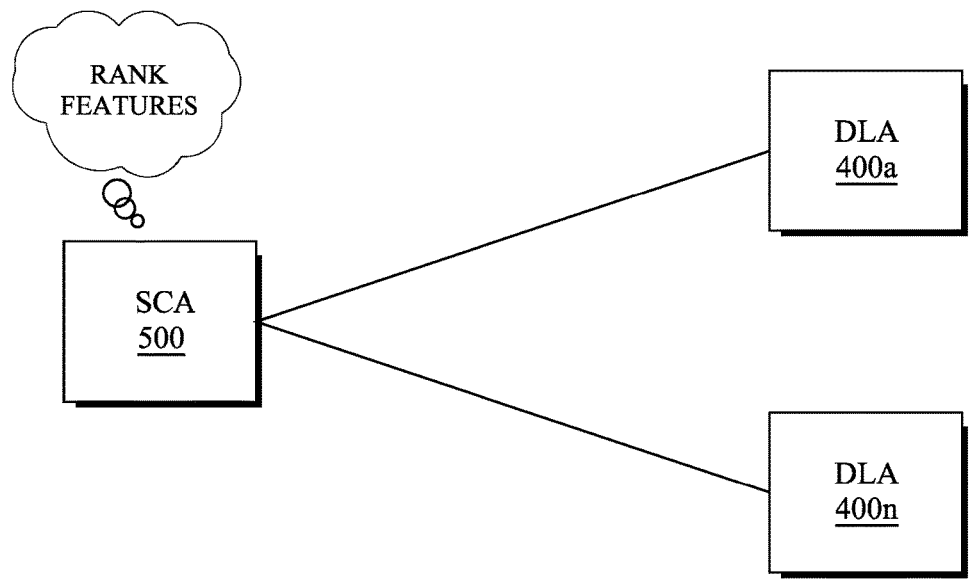

In various embodiments, the anomaly detectors on DLAs 400a-400n may be based on network traffic patterns, but the techniques herein may be used for other applications, as well. For example, an anomaly detector on DLA 400a may assess traffic data and generate anomaly scores based on how anomalous a particular sample is. In turn, DLAs 400a-400n may report the anomaly scores and/or scored features to SCA 500 via messages 502a-502n, respectively. Thus, the system may rank samples according to how anomalous they are, based on their resulting anomaly scores, as shown in FIG. 5C.

Ideally, the system will rank the most critical anomalies higher than the least critical anomalies. However, the notion of criticality is both subjective and time dependent. Different situations (e.g., the location of a DLA in the network, user views, etc.) may call for different definitions of criticality. Furthermore, the notion of criticality is not necessarily correlated with the notion of statistical likelihood. In particular, a specific anomaly may be ranked highly because of its rare nature from an algorithmic perspective without being highly critical. Given a finite set of features, a statistical outlier may be less critical than another, at least for a particular situation, but more critical from the standpoint of a network administrator.

In various embodiments, the system may be configured to orient the anomaly detection mechanisms towards detecting particular anomalies, while still retaining their unsupervised natures. Thus, the question becomes one of which features should be selected for analysis by the anomaly detectors. In other words, the system must select the right features to increase the rank of the desired anomalies, while still retaining the unsupervised nature of the anomaly detection mechanisms.

Figure 5D:
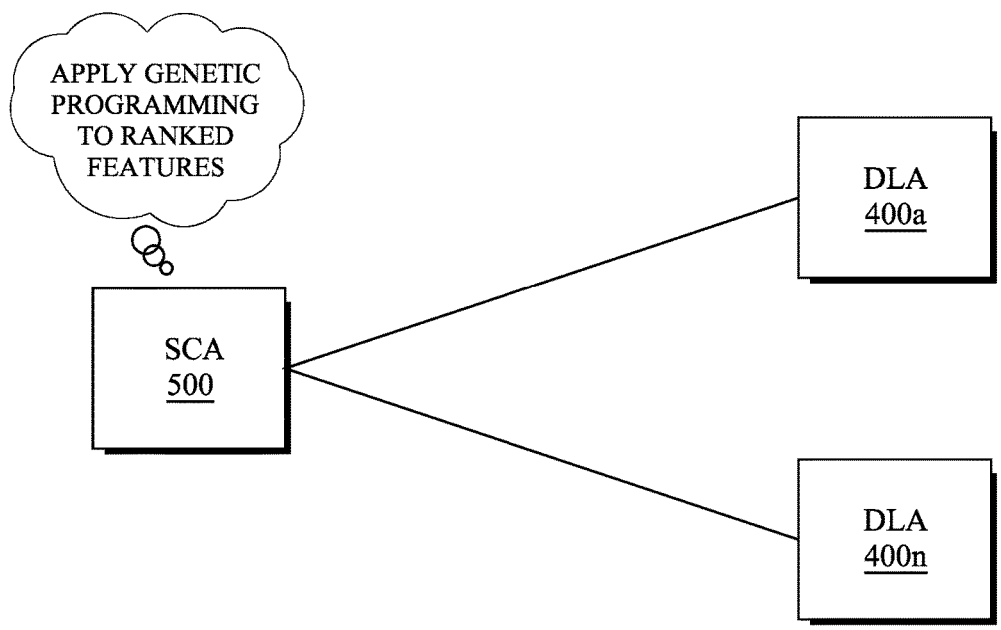
Figure 5E:
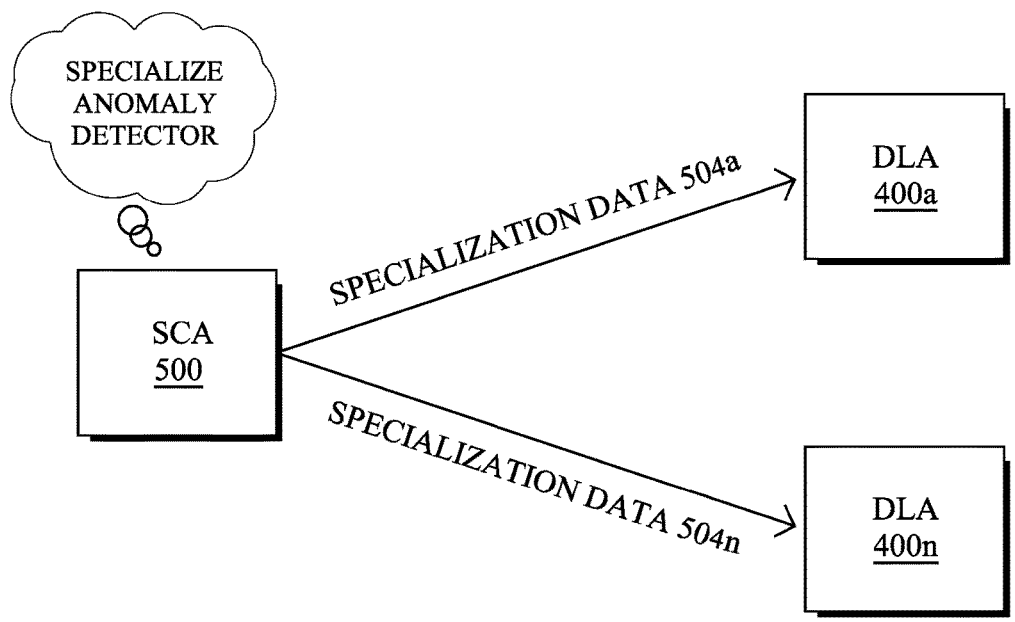

In some embodiments, the system may use a genetic programming approach, as shown in FIG. 5D, to select the proper input features that will specialize the anomaly detectors towards a particular type of anomaly. In general, genetic programming is a class of evolutionary techniques in which "individuals" are generated at random at first and left to "evolve" by iterative "reproductions," "mutations," and "natural selection." In other words, genetic programming attempts to mimic the genetic changes over time in biological functions, to generate new permutations of data.

Individuals have a "genome" constituted of the different parameters to choose. The reproduction of the individuals reduces to selecting random parts of the genome of two individuals from generation N, and combining them for form generation N+1. This is called "crossover." During this reproduction, mutations can occur in the form of the alteration of one or a small number of these genes/datasets. Only the top individuals of generation N, according to some measure of performance called "fitness," are allowed to reproduce so that the successive generations should improve this fitness.

In various embodiments, the device specializing an anomaly detector may iterate through the following steps, after creating generation 0 pseudo-randomly:
1. Evaluate the fitness of the individuals of generation N
2. Select the top K individuals
3. Have the top K reproduce, by crossover.
4. Apply mutations with probability p«1 on the newly generated genomes.

Once population N+1 is obtained from the above steps, steps 1-4 can be repeated for this generation, to form the next generation's population.

In the context of anomaly detection in a network, the genome of each individual is a set of Boolean variables specifying whether a feature of the anomaly detector is activated. In other words, the system may evaluate the effects of using different input features to the anomaly detector. For example, in some embodiments, the device (e.g., SCA 500, an individual DLA 400, etc.) may perform any or all of the following steps, to evaluate the input features:
1. Use the anomaly detector to evaluate a set of traffic traces and record the rank of the generated anomalies.
2. Apply a fitness function to the individuals that is monotonically increasing with the rank, as detailed below.
3. Perform genetic programming crossover based on the features.
4. Apply "mutations" to the genomes (e.g., the sets of input features used) by flipping random bits in the genome, with a small probability.

One potential issue in this context of binary parameters is the uniformity of the obtained solutions. For example, if the top K-number of individuals are selected, all individuals will end up with roughly the same genome after a few iterations, resulting in "consanguinity" problems where reproduction becomes inefficient. This is due to the search space being much smaller in size compared to problems with real number parameters. Here, the set of possible solutions is actually finite, albeit too large to explore systematically. In various embodiments, the following mechanisms address this "biodiversity" issue:

Use a larger than usual size of the populations and probability of mutation.

Allow a small number of random individuals to reproduce as well (e.g., individuals outside of the top K-number of individuals can also reproduce).

Generate the initial population with a uniform number of set bits, instead of a uniform probability of setting a bit. The latter approach generates individuals with a number of set bits following a Gaussian distribution centered on half the total number of genes in the genome, leading in itself to a not diverse enough population. The former approach, however, generates a population with some individuals having only a very small number of set bit and other ones with a large number of set bits, thus resulting in a small/large number of features used by the anomaly detector.

Of the above, the third approach is particularly potent, whereby the number of features used for the model influences the performance (e.g., the fitness) of the system, as well as the particular features selected.

In various embodiments, the device may use a genetic programming fitness function that can be of several different forms, to specialize the anomaly detector towards a specific type of anomaly. In some embodiments, the fitness function may be a monotonic function of the rank of the desired kind of anomalies. Using the rank is advantageous as it casts the problem of keeping a high rank for the desired anomalies as a ranking problem, and not as a classification problem. In particular, it is not sensitive to thresholding that may be performed downstream. Furthermore, the fitness function should represent the performance of the anomaly detector in a usable fashion for a whole range of performance levels. Intuitively, the system may represent changing the rank for the desired anomaly from k*r to r by the same increase in fitness, for all values of r (e.g., the rank). This suggests using a log-transformation of the rank, in some embodiments. For example, the fitness function may be a decreasing function of log(r).

In another embodiment, the device may attempt to maximize the number of used features (e.g., to make the anomaly detector as general as possible), while still maintaining a high rank for the desired anomalies (e.g., to also offer specificity for the selected anomalies). This would allow the unsupervised anomaly detector to detect a wide variety of anomalies, while still promoting the ones of interest for a particular situation. For example, a possible equation for the fitness function is as follows:

$$\mathcal{F} = \left(\frac{1}{1+\log r}\right)^\beta \cdot \left(\frac{n_f}{N_f}\right)^\gamma$$

where $n_f$ is the number of selected features (e.g., the set bits in the genome of the individual), $N_f$ the total number of available features (e.g., the total number of bits in the genome), N the number of samples, and $\beta$ and $\gamma$ are positive scaling factors to tune the importance of one criterion with respect to the other.

Once the anomaly detector has been specialized, the device may cause the specialized detector to begin analyzing traffic data in the network. For example, if SCA 500 computes the specialized anomaly detector, it may provide the corresponding specialization data 504a-504n to any or all of DLAs 400a-400n. In turn, any of the receiving DLAs 400a-400n may use the specialized anomaly detector to assess captured traffic data.

In some implementations, the feature selection mechanism described above is performed prior to deployment of the system on a network. Once the right set of feature is selected for a particular goal, the feature selection is not necessary anymore. Feature selection may then be updated only at specific times, such as with new software releases, etc.

In other embodiments, where many network devices use the same anomaly detector (e.g., multiple DLAs in an SLN), the feature selection mechanism could be performed online via the exchange of messages between all devices. In an initial "observation" phase, each instance of the anomaly detector on the DLAs may use a different set of features. The genetic programming approach can then be applied at a centralized location by collecting anomalies generated by all appliances (e.g., at an SCA). In a first observation phase, the genetic programming may learn the right set of features by pushing down the set of features to use to the anomaly detector instances, monitoring the generated anomalies, and ranking them according to user feedback or predefined rules. After an acceptable solution is found, the genetic programming may push the genome of the best individual to all devices (e.g., DLAs) and enter an actual anomaly detection mode.

Figure 6:
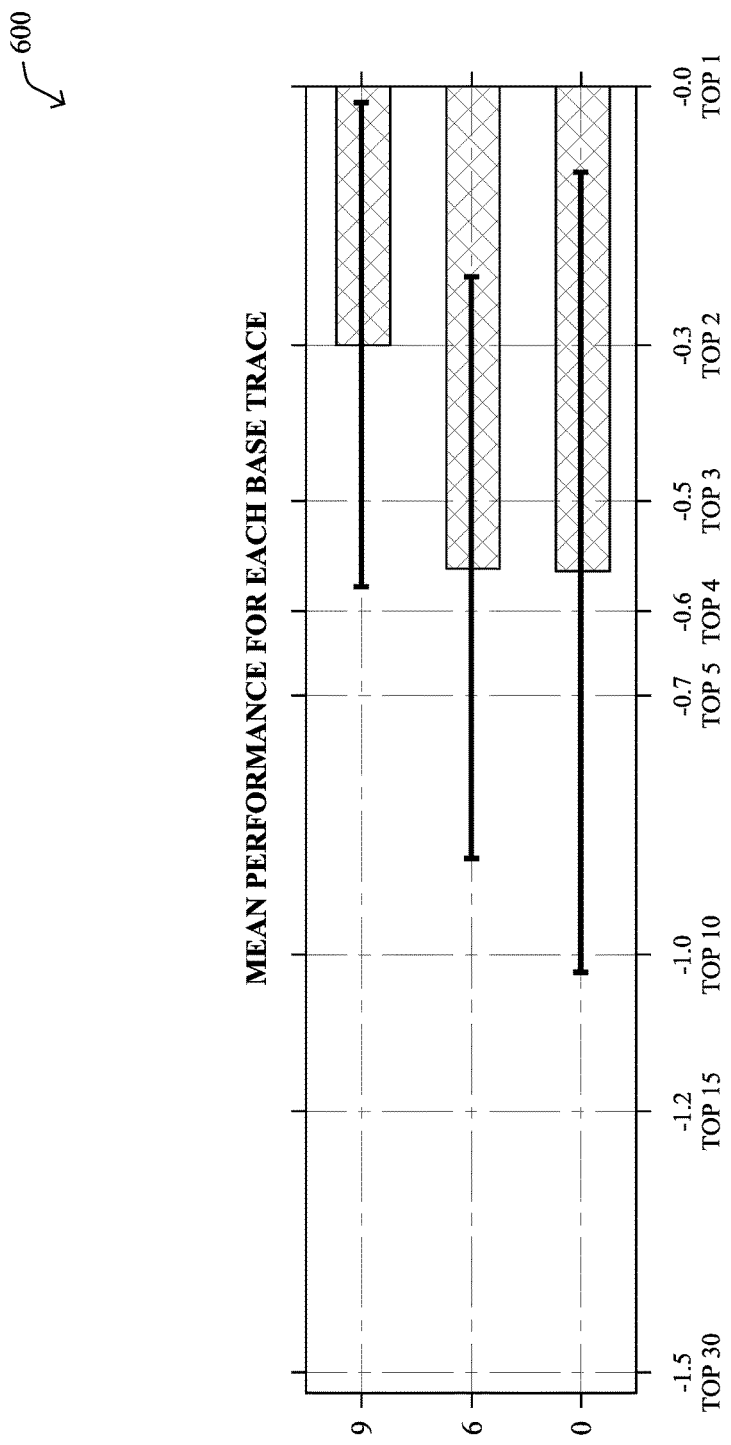
FIG. 6 illustrates a plot of test results using the techniques herein.

Referring now to FIG. 6, a working prototype of the techniques herein was constructed. In particular, plot 600 illustrates test results from a prototype, host centric anomaly detection system based on dictionary learning and sparse coding. In particular, the genetic programming approach was developed using custom methods for improving biodiversity written in Python and used on top of a C++ implementation of an anomaly detector that was based on dictionary learning and sparse coding.

For three series of experiments, the mean −log(r) is plotted along the y-axis, where r is the rank of the desired anomaly for various traces and anomalies. The mean is around −0.55 (e.g., the geometric mean of the ranks is between 3 and 4) and the desired anomaly is around the $4^{th}$ place among all samples.

Beforehand, the performance of the system was around −3, represented by the same metric. As there are approximately one million samples in a trace, the worst possible value for the metric is −6. Based on the test results, the techniques herein have brought a gain of about 2.5. In other words, the techniques have driven the optimization of the feature vector to promote the desired anomaly by a factor of 300.

Figure 7:
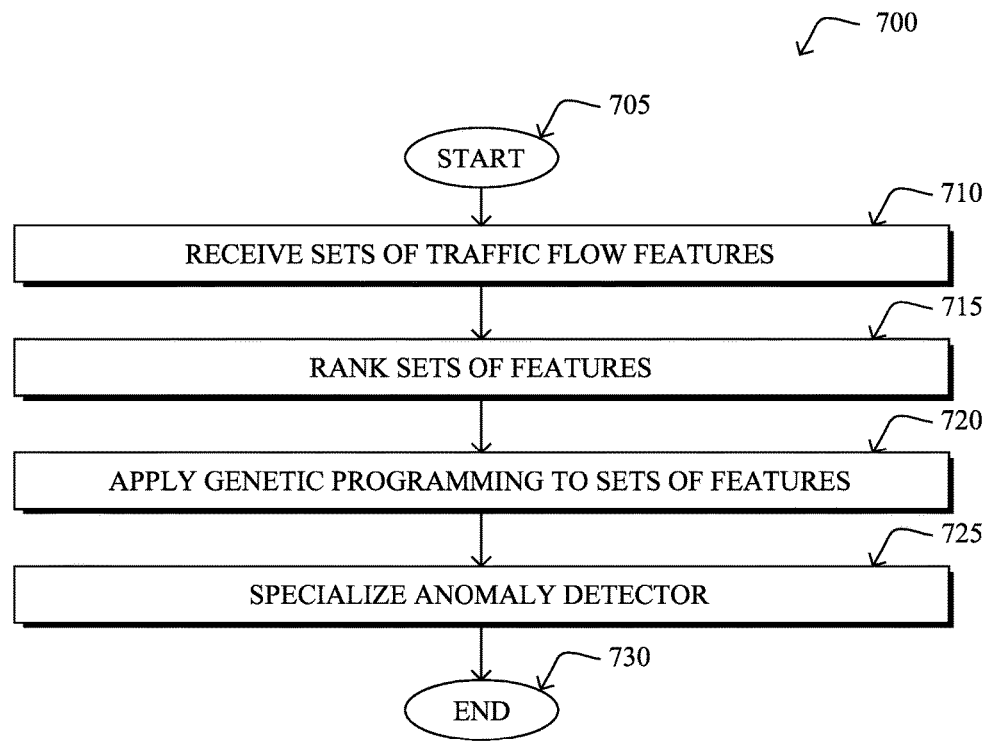
FIG. 7 illustrates an example simplified procedure for specializing an unsupervised anomaly detector using genetic programming.

FIG. 7 illustrates an example simplified procedure for specializing an unsupervised anomaly detector using genetic programming, in accordance with one or more embodiments described herein. For example, a non-generic, specifically configured device (e.g., device 200) may perform procedure 700 by executing stored instructions. The procedure 700 may start at step 705, and continues to step 710, where, as described in greater detail above, the device may receive a set of traffic flow features. In general, these features may be any form of captured information regarding traffic in the network. For example, the features may include, but are not limited to, information regarding the traffic size (e.g., packet size), flow durations, endpoint devices (e.g., source, destination, etc.), associated applications or protocols, statistics thereof (e.g., minimum, maximum, average, etc.), or the like. In various embodiments, the sets of traffic flow features may also be associated with anomaly scores determined by an unsupervised, machine learning-based anomaly detector.

At step 715, as detailed above, the device may rank the sets of features based on their anomaly scores. For example, the device may order the sets of features and their corresponding anomalies based on the anomaly scores from the anomaly detector.

At step 720, the device may apply a genetic programming approach to the ranked sets of traffic flow features to generate new sets of traffic flow features, as described in greater detail above. Such an approach may iteratively test the effects of varying the sets of input features for the anomaly detector. In some embodiments, the genetic programming approach uses a fitness function that is based in part on the rankings of the sets of traffic flow features. For example, the genetic programming approach may attempt to identify the set of input features for the anomaly detector that emphasizes a particular type of anomaly (e.g., by increasing the rank of the anomaly).

At step 725, as detailed above, the device may specialize the anomaly detector to emphasize a particular type of anomaly using the new sets of traffic flow features. For example, assume that the system is to emphasize DNS-related attacks. In such a case, the system may use genetic programming as in step 720 to identify a set of input features for the anomaly detector that would improve the ranking of the anomaly detector, while still maintaining the ability of the detector to operate in an unsupervised manner. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the instantiation of specialized versions of an otherwise highly general unsupervised anomaly detector. The specialized detector is oriented towards detecting specific kinds of anomalies while remaining unsupervised, hence able to adapt online to changes in traffic patterns. While the techniques herein are particularly useful to promote specific anomalies, the techniques can also be used to demote anomalies that are deemed irrelevant, by discarding the features that cause them to be highly ranked.

While there have been shown and described illustrative embodiments that provide for the specialization of an unsupervised anomaly detector, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

receiving, at a device in a network, sets of traffic flow features from an unsupervised machine learning-based anomaly detector, wherein the sets of traffic flow features are associated with anomaly scores determined by the unsupervised machine learning-based anomaly detector;

ranking, by the device, the sets of traffic flow features based in part on their anomaly scores;

applying, by the device, a genetic programming approach to the ranked sets of traffic flow features to generate new sets of traffic flow features to specialize the unsupervised machine learning-based anomaly detector for a particular type of anomaly, wherein the genetic programming approach uses a fitness function that is based in part on rankings of the sets of traffic flow features associated with the particular type of anomaly and uses a log transformation of the rankings of the sets of traffic flow features;

specializing, by the device, the unsupervised machine learning-based anomaly detector to emphasize the particular type of anomaly at the unsupervised machine learning-based anomaly detector using the new sets of traffic flow features generated by the genetic programming approach; and mitigating, by the device, an instance of the particular type of anomaly that is detected by the unsupervised machine learning-based anomaly detector, wherein the mitigating comprises at least one of rerouting a traffic flow associated with the instance, performing traffic shaping of the traffic flow associated with the instance, or dropping the traffic flow associated with the instance.

2. The method as in claim 1, wherein the fitness function is a monotonic function of the ranking of the sets of traffic flow features associated with the particular type of anomaly.

3. The method as in claim 1, wherein the fitness function is configured to maximize a number of features included in the new sets of traffic flow features.

4. The method as in claim 1, further comprising:
receiving, at the device, the traffic flow features from one or more other devices in the network; and
providing, by the device, the specialized unsupervised machine learning-based anomaly detector to the one or more other devices in the network.

5. The method as in claim 1, further comprising:
using, by the device, the specialized unsupervised machine learning-based anomaly detector to assess captured traffic flow features from the network.

6. An apparatus, comprising:
one or more network interfaces to communicate with a network;
a processor coupled to the network interfaces and configured to execute one or more processes; and
a memory configured to store a process executable by the processor, the process when executed configured to:
receive of traffic flow features from an unsupervised machine learning-based anomaly detector, wherein the sets of traffic flow features are associated with anomaly scores determined by the unsupervised machine learning-based anomaly detector;
rank the sets of traffic flow features based in part on their anomaly scores;
apply a genetic programming approach to the ranked sets of traffic flow features to generate new sets of traffic flow features to specialize the unsupervised machine learning-based anomaly detector for a particular type of anomaly, wherein the genetic programming approach uses a fitness function that is based in part on rankings of the sets of traffic flow features associated with the particular type of anomaly and uses a log transformation of the rankings of the sets of traffic flow features;
specialize the unsupervised machine learning-based anomaly detector to emphasize the particular type of anomaly at the unsupervised machine learning-based anomaly detector using the new sets of traffic flow features generated by the genetic programming approach; and
mitigate an instance of the particular type of anomaly that is detected by the unsupervised machine learning-based anomaly detector, wherein the mitigation comprises at least one of rerouting a traffic flow associated with the instance, performing traffic shaping of the traffic flow associated with the instance, or dropping the traffic flow associated with the instance.

7. The apparatus as in claim 6, wherein the fitness function is a monotonic function of the ranking of the sets of traffic flow features associated with the particular type of anomaly.

8. The apparatus as in claim 6, wherein the fitness function is configured to maximize a number of features included in the new sets of traffic flow features.

9. The apparatus as in claim 6, wherein the process when executed is further operable to:
receive the traffic flow features from one or more other devices in the network; and
provide the specialized unsupervised machine learning-based anomaly detector to the one or more other devices in the network.

10. The apparatus as in claim 6, wherein the process when executed is further operable to:
use the specialized unsupervised machine learning-based anomaly detector to assess captured traffic flow features from the network.

11. A tangible, non-transitory, computer-readable medium storing program instructions that cause a device in a network to perform a process comprising:
receiving, at the device, sets of traffic flow features from an unsupervised machine learning-based anomaly detector, wherein the sets of traffic flow features are associated with anomaly scores determined by the unsupervised machine learning-based anomaly detector;
ranking, by the device, the sets of traffic flow features based in part on their anomaly scores;
applying, by the device, a genetic programming approach to the ranked sets of traffic flow features to generate new sets of traffic flow features to specialize the unsupervised machine learning-based anomaly detector for a particular type of anomaly, wherein the genetic programming approach uses a fitness function that is based in part on rankings of the sets of traffic flow features associated with the particular type of anomaly and uses a log transformation of the rankings of the sets of traffic flow features;
specializing, by the device, the unsupervised machine learning-based anomaly detector to emphasize the particular type of anomaly at the unsupervised machine learning-based anomaly detector using the new sets of traffic flow features generated by the genetic programming approach;
mitigating, by the device, an instance of the particular type of anomaly that is detected by the unsupervised machine learning-based anomaly detector, wherein the mitigating comprises at least one of rerouting a traffic flow associated with the instance, performing traffic shaping of the traffic flow associated with the instance, or dropping the traffic flow associated with the instance.

12. The computer-readable medium as in claim 11, wherein the fitness function is a monotonic function of the ranking of the sets of traffic flow features associated with the particular type of anomaly.

13. The computer-readable medium as in claim 11, wherein the fitness function is configured to maximize a number of features included in the new sets of traffic flow features.

14. The computer-readable medium as in claim 11, wherein the process further comprises:
receiving, at the device, the traffic flow features from one or more other devices in the network; and providing, by the device, the specialized unsupervised machine learning-based anomaly detector to the one or more other devices in the network.

\* \* \* \* \*

UNITED STATES PATENT AND TRADEMARK OFFICE
CERTIFICATE OF CORRECTION

PATENT NO. : 10,218,729 B2
APPLICATION NO. : 15/205122
DATED : February 26, 2019
INVENTOR(S) : Gay et al.

It is certified that error appears in the above-identified patent and that said Letters Patent is hereby corrected as shown below:

In the Specification

Column 6, Line 12, please amend as shown:
VPN"<draft-ietf-l2vpn-evpn>, introduce a solution for mul- Signed and Sealed this
Fourth Day of February, 2020

Andrei Iancu
*Director of the United States Patent and Trademark Office*